United States Patent [19]
Anderson

[11] 3,818,659
[45] June 25, 1974

[54] CONSTRUCTION FOR MOUNTING AND SUPPORTING LINES, SUCH AS AIR CONDUITS AND ELECTRICAL CONDUCTORS

[75] Inventor: Leonard M. Anderson, Michigan City, Ind.

[73] Assignee: Clark Equipment Company, Buchanan, Mich.

[22] Filed: Dec. 11, 1972

[21] Appl. No.: 313,819

[52] U.S. Cl.................. 52/220, 52/287, 52/466, 52/716
[51] Int. Cl............................................. E04b 5/48
[58] Field of Search ............ 52/220, 221, 241, 242, 52/287, 288, 416, 466; 174/48, 49, 97, 99 R

[56] References Cited
UNITED STATES PATENTS

| 1,800,552 | 10/1962 | Barass | 52/241 |
|---|---|---|---|
| 1,800,609 | 4/1931 | Drake | 52/466 X |
| 2,078,968 | 5/1937 | Patterson | 52/220 |
| 2,132,400 | 10/1938 | Curren | 52/716 |
| 2,134,393 | 10/1938 | Bennett | 52/220 |
| 3,163,461 | 12/1964 | Troy | 52/495 X |
| 3,302,350 | 2/1967 | Brown et al. | 52/220 |
| 3,377,756 | 4/1968 | Polhamus | 52/220 |
| 3,494,657 | 2/1970 | Tantlinger et al. | 174/49 X |
| 3,524,477 | 8/1970 | Steger | 174/49 |
| 3,681,883 | 8/1972 | Ehrlich | 52/220 |

FOREIGN PATENTS OR APPLICATIONS

| 1,317,930 | 1/1963 | France | 52/287 |
|---|---|---|---|
| 1,206,101 | 9/1970 | Great Britain | 174/48 |
| 1,955,544 | 6/1970 | Germany | 52/220 |
| 1,213,808 | 4/1960 | France | 52/220 |
| 1,020,164 | 2/1966 | Great Britain | 52/288 |

*Primary Examiner*—Henry C. Sutherland
*Assistant Examiner*—Leslie A. Braun
*Attorney, Agent, or Firm*—Paul H. Gallagher

[57] ABSTRACT

A construction for mounting and supporting lines, such as air conduits and electrical conductors; and includes an assembly incorporated in the floor of a vehicle, such as a truck or trailer; it includes a cover flush with the top surface of the floor and reaching down into a slot or groove; it further includes retainers snapped into the cover and supporting the lines, while the cover supports the retainers; the cover, since it is flush with the floor, forms a continuation or part of the floor, and it is of such strength and construction as to withstand the same loads placed upon the main part of the floor.

6 Claims, 4 Drawing Figures

PATENTED JUN 25 1974 3,818,659

CONSTRUCTION FOR MOUNTING AND SUPPORTING LINES, SUCH AS AIR CONDUITS AND ELECTRICAL CONDUCTORS

FIELD OF THE INVENTION

The invention relates to constructions in vehicles, such as trucks and trailers, and particularly to means for bringing the usual lines, including air conduits and electrical conductors from the power plant to the rear. When such lines are embedded in the floor of the vehicle, various difficulties have been encountered, both from the standpoint of maintaining the intended surface of the floor, and retaining the lines in proper position and protecting them against deterioration such as may be caused by abrading against other lines and against the supporting elements.

OBJECTS OF THE INVENTION

A broad object of the invention is to provide novel construction for mounting and supporting lines such as air lines and electrical lines in the floor of a vehicle.

Another object is to provide a construction of the foregoing kind which provides various advantages:

a. It enables improved serviceability of the lines when they are in place and without the necessity for removing the construction.

b. The parts of the construction can be preassembled before placement in the floor, shortening the installation time and correspondingly effecting savings in overall manufacturing.

c. The construction includes a cover which is flush with the floor of the vehicle, forming a continuation of the floor and assisting in supporting a load on the floor (e.g. a lift truck) and facilitating its movement over the floor.

d. A single such construction is adapted to incorporation in any floor within a wide range of thickness.

e. The construction includes retainers which support the lines and which are in themselves supported by the cover, whereby to allow the positioning of retainers at any point along the length of the cover and to eliminate the possibility of air and electrical lines from chafing on the floor members.

f. The construction is extremely simple.

DESCRIPTION OF A PREFERRED EMBODIMENT

Figure 1:
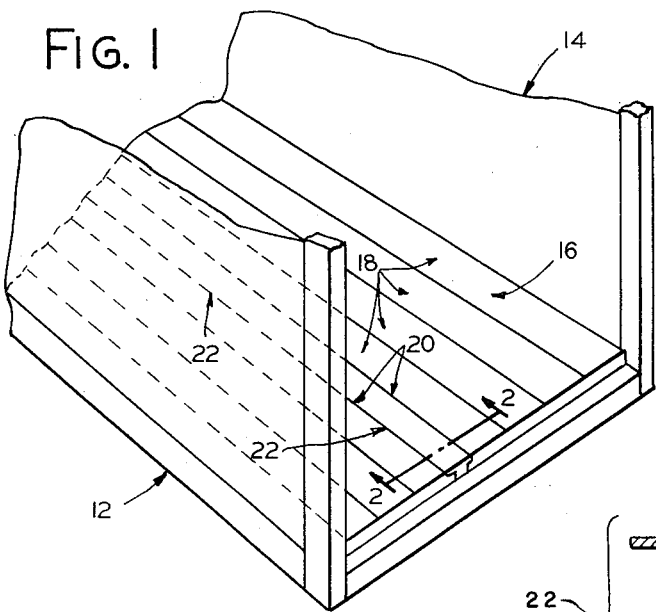
FIG. 1 is a perspective view of a portion of a vehicle body indicating the device of the present invention embodied therein.

Referring in detail to the drawings, FIG. 1 is a perspective view of a portion of a body of a vehicle in which the invention may be incorporated, such as a truck or trailer. The body is indicated at 12 and its overall construction may be conventional, but it includes detailed variations for incorporating the construction of the present invention. The body includes for example sidewalls 14 and a floor 16. The floor 16 may be made up of a plurality of side-by-side longitudinally extending elements or boards 18 which include a plurality on opposite sides of the middle where they are spaced apart to form a slot or groove 20 in which the device of the present invention is placed, this device or construction being identified generally at 22. As indicated in FIG. 1, the construction 22 extends the full length of the vehicle body and the lines, i.e., the air conduits and electrical conductors which lead from the power plant at the front end of the vehicle, are brought through this construction to or near the rear end for connection to various lights and brake components.

The floor may also include floor members 26 which may be in the form of I-beams extending transversely across the vehicle body, the floor elements or boards 18 resting on these floor members.

The device 22 of the present invention includes two main parts, a cover 28 and a plurality of retainers 30 in a self contained assembly, the retainers all being identical.

The cover 28 is preferably a continuous aluminum extrusion and it is dimensioned to extend the full length of the floor, as indicated above in connection with FIG. 1. The cover includes a main horizontal top element 32 and side flanges 34, the latter having suitable countersunk holes 36 for mounting screws which are flush with the flanges. The element 32 and flanges 34 present a common top planar surface which, when the device is mounted, is flush with the top surface of the floor 16 of the vehicle.

The cover includes a pair of transversely spaced, longitudinally extending ribs forming securing or latching elements 38, having lower inwardly directed camming surfaces 40 forming upwardly directed shoulders 42.

The latching elements 38 cooperate with corresponding latching elements on the retainers, as explained below, for releaseably latching the retainers into supporting engagement with the cover 28. The latching elements 38 are preferably spaced apart, relative to the predetermined transverse dimension of the groove 20, so that their outer surfaces are spaced apart a distance only slightly less than the width of the slot, to prevent accidental unlatching.

Figure 3:
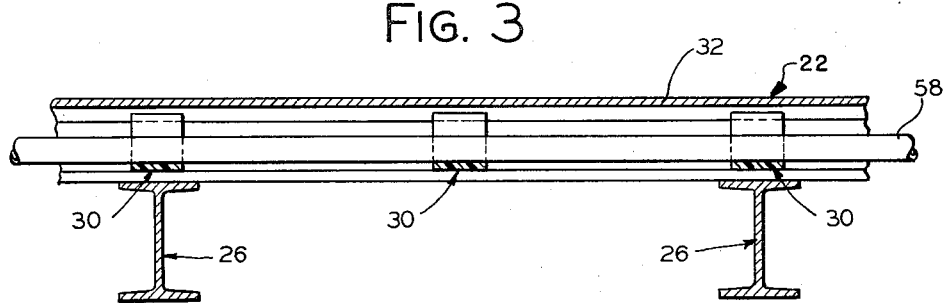
FIG. 3 is a sectional view taken at line 3—3 of FIG. 2.

The retainers 30 as indicated above are all identical, and preferably are of short dimension longitudinally, as indicated in FIG. 3. Each retainer includes a bottom element 46 (FIG. 4) and side ribs forming securing or latching elements 48. The retainer forms a plurality of grooves 50, such as three in number formed by the side latching elements 48 and a pair of ribs 52, the latter having outwardly directed protuberances 53 shaped to frictionally grip the lines in the associated grooves. The side latching elements 48 are provided at their upper edges with outwardly directed camming surfaces 54 forming downwardly directed shoulders 56.

The retainer 30 is preferably of plastic and the side latching elements 48 are flexible in transverse directions for latching the retainers to the cover as described hereinbelow.

Figure 4:
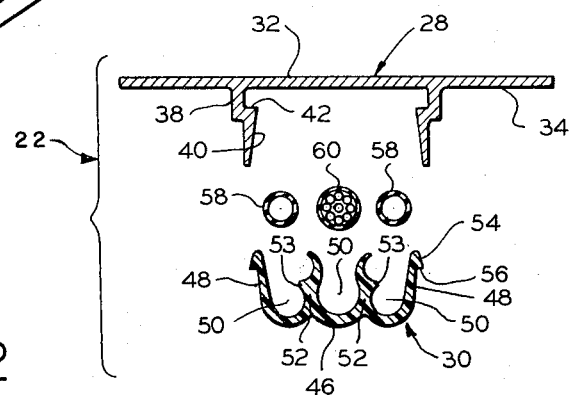
FIG. 4 is an end view of the device of the present invention shown in separated form and indicating the assembly of the parts thereof.

FIG. 4 shows the lines which are to be accommodated, being in this case three in number, including two air conduits 58 and a single electrical cable 60, which are to be fitted in the grooves 50.

Figure 2:
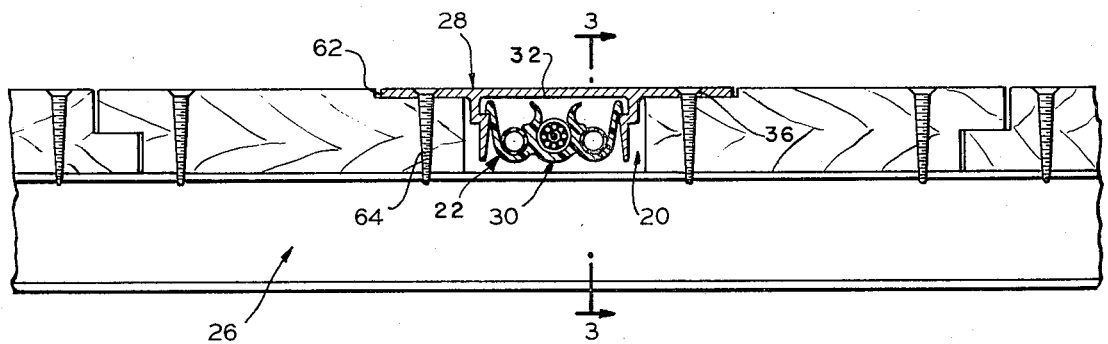
FIG. 2 is a sectional view taken at line 2—2 of FIG. 1.

FIG. 4 indicates a step in the assembly of the parts making up the construction, and incorporating the lines therein. The lines would be fitted in the grooves 50 as a preliminary step in the assembly operation. In this step, in putting the air conduits 58 into the outside grooves 50, the side latching elements 48 would be sprung out enabling the conduits to pass by the protuberances 53. The electrical cable is pushed into the center groove, and then the two main parts are snapped together, such as by resting the cover, upside down, on a supporting surface and putting the retainers, with the lines installed, into place thereover, i.e., pushing them down between the cover latching elements 38. In this step of the assembly, the camming surfaces 54 and 40 interengage, springing the latching elements 48 inwardly, until the camming surfaces pass beyond each other when the shoulders 56, 42 inter-engage and normally hold the two main members together. When the parts are so assembled, they assume a position represented in FIG. 2. The outwardly directed protuberances 53 normally retain the air conduits in the corresponding (outer) grooves while the electrical conduit 60 is retained in the center groove by the inwardly biasing of the ribs 52.

The principal flexibility in the latching operation is provided by the arms 48, the retainer being made of plastic material having substantial flexibility. The transverse dimension of the arms 48 just below the shoulders 56 is preferably slightly greater than the transverse dimension of the camming surfaces 40 at their narrowest position, at the top, whereby upon inwardly biasing or deflection of the arms 48 in the operation of being snapped into place, the self-biasing characteristic of those arms assures the outward positioning thereof and the constant interengagement of the shoulders 56 with the shoulders 42. This results in a corresponding slight inward biasing position of the arms 48 so as to securely hold the air conduits in the outer grooves 50, aided by the shape of the protruberances 53. Similarly, the electrical cable 60 is held in the center groove 50 because of the lesser dimension of the upper portion of that groove relative to the lower portion, aided by the inwardly flexed position of the ribs 52.

After the cover and retainers are thus assembled, the assemblage is put into position in the slot or groove 20 and the side flanges 34 are fitted into notches 62 cut in the floor boards 18 and countersunk screws 64 or other suitable fasteners are utilized to hold the assemblage in place.

The latching members 48, 38 operate to completely hold the retainers, and the lines are supported completely by the retainers and therefore the lines are held indirectly by the cover. As many retainers 30 as desired may be utilized, spacing them along the device according to the load of the lines and any other considerations. The lines are held in place in the grooves, the outer air lines by the constricted top openings of the grooves and the central electrical line by the ribs 52.

There is no binding compression of the lines between the cover and the retainers. Similarly there is no compression against the bottom of the retainers as by the floor members 26, if the retainers should rest thereon.

There is substantial latitude in the permissible construction of the cover and retainers, such as to provide a minimum depth or thickness of the assembly so that the assembly would not reach to the under surface of the floor boards, and therefore a single construction can be provided for any of a wide range of depths or thicknesses of the floor boards.

The flexibility of the arms 48 of the retainer in addition to facilitating assembly of the parts together, also facilitates removal of the retainer from the holder. For example, a repair man by utilizing a simple tool such as a screw driver can pry one arm 48 inwardly to release the retainer from the cover, and this will expose the lines, i.e., the air conduits and electrical conductor. This provides a facility in repairing the lines from underneath the vehicle. The retainers are held by the cover in whatever position, longitudinally of the cover, they are placed, and even if one or more should be positioned directly over the floor support 26, which is not necessary, the repairman can slide the retainer along the cover to expose it for removal, in the manner stated, as by manipulation by a screw driver.

The retainers 30 are provided according to the necessary supporting characteristics, according to the load to be carried, i.e., the weight of the air conduits and electrical conductors, as well as the stiffness thereof, the latter characteristic of course working toward a fewer number of retainers along any given length of those lines.

The device is effective for maintaining the lines in position according to regulations affecting motor carriers, i.e., they cannot jump out of place and become abraded.

The lines are exposed at the under side except for the minor longitudinal dimensions of the retainers, facilitating servicing of the lines from beneath without necessitating removal of the construction. Even if it should be necessary to remove the complete construction, such is facilitated by the fact that it can be done by merely removing the screws 64 and lifting the complete assembly out.

The retainers may be positioned over the floor members 26 as indicated in FIG. 3 or they may be positioned between those floor members as indicated in the same figure, the floor members not being relied on to support the retainers.

I claim:

1. A construction for mounting and supporting lines in conjunction with a floor member, comprising, the floor member having a pair of side portions spaced apart to form a longitudinal slot therebetween, a mounting assembly in the slot, which includes two main members, namely, a cover member and a plurality of retainers, the cover member comprising a single member extending the length of the slot and including a flat top element and transversely spaced longitudinal ribs, forming latching members, extending the length of the cover member and extending downwardly into the slot, the ribs also being spaced inwardly from the side edges of the top element, forming side mounting flanges on the top element, the ribs having inwardly directed camming surfaces at their lower ends forming upwardly directed shoulders, the outer surfaces of the ribs being spaced apart only slightly less than the width of the slot in the floor, the retainers being of only minor length relative to the cover member, and each including a bottom element and side ribs extending longitudinally and forming latching members, the ribs on the retainer being spaced inwardly of the ribs on the cover member, and having outwardly directed camming elements forming downwardly directed shoulders, the respective camming elements and shoulders cooperating with each other in latching operation, each retainer also including a plurality of longitudinal grooves for receiving lines, having restricted open sides for retaining the lines therein, the side mounting flanges being embedded in the floor member and the floor member thereby supporting the cover, the retainers supporting the lines therein, and the retainers being supported entirely by the cover member.

2. A construction for mounting and supporting lines in a floor member having a flat top surface and a slot in the floor member comprising, a continuous cover member having a flat top element terminating in side flanges, the floor member having notches leading outwardly from the slot, and the side flanges being fitted in the notches so that the top surface of the cover member is flush with the top surface of the floor member, the cover member having latching members extending downwardly into the slot adjacent the sides of the slot, retainers in the slot each having a bottom element and latching members extending upwardly into the slot in close proximity to the latching members on the cover member, the latching members on the cover member and on the retainers having interlocking latching shoulders normally supporting the retainers on the cover member, the latching members being relatively yieldable laterally for releasing the latching shoulders and thereby releasing the retainers from support from the cover member, the latching members on the cover member and the retainers being so relatively dimensioned that the lowermost point of the retainers is above the lowermost point of the floor member, whereby the retainers are supported by the cover member, and lines in and extending along the slot and supported by the retainers, and thereby supported indirectly by the cover member.

3. A construction according to claim 2 wherein the retainers are of short length relative to the cover member and expose the greatest part of the lines beneath the cover, whereby to provide ready access to the lines from beneath the floor without separating the cover member and retainers.

4. A construction according to claim 2 wherein the latching members are in the form of longitudinal ribs, and the ribs have interengaging camming surfaces and oppositely disposed shoulders forming said latching elements whereby by moving the cover and retainers toward each other the latching members interlatch.

5. A construction according to claim 4 wherein each retainer has a pair of transversely spaced, longitudinally extending ribs, the ribs between themselves forming a central groove, and the ribs outwardly thereof, and between each rib and the respective side latching member, forming side grooves, the lines being positioned in respective grooves, and the ribs having transversely outwardly extending tips which with the side latching members on the retainer form restricted openings to said side grooves, whereby to normally hold the lines placed in the side grooves.

6. A construction according to claim 4 wherein the latching members on the retainers are disposed inwardly of those on the cover member and are flexible in transverse directions and they flex inwardly in response to moving the cover member and retainers together in latching direction, and thereafter move outwardly, and the outer latching members on the cover member have a transverse spacing only slightly less than the width of the slot in the floor member whereby the outer latching members on the cover member are prevented from moving outwardly and they thereby prevent an accidental unlatching operation.

* * * * *